(12) United States Patent
Hong

(10) Patent No.: US 11,799,351 B2
(45) Date of Patent: Oct. 24, 2023

(54) MOTOR

(71) Applicant: LG INNOTEK CO., LTD., Seoul (KR)

(72) Inventor: Hoon Ki Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 377 days.

(21) Appl. No.: 17/421,092

(22) PCT Filed: Jan. 8, 2020

(86) PCT No.: PCT/KR2020/000309
§ 371 (c)(1),
(2) Date: Jul. 7, 2021

(87) PCT Pub. No.: WO2020/145645
PCT Pub. Date: Jul. 16, 2020

(65) Prior Publication Data
US 2022/0109347 A1     Apr. 7, 2022

(30) Foreign Application Priority Data

Jan. 11, 2019   (KR) .......................... 10-2019-0003798

(51) Int. Cl.
*H02K 5/22* (2006.01)
*H02K 1/04* (2006.01)
(Continued)

(52) U.S. Cl.
CPC .............. *H02K 5/225* (2013.01); *H02K 1/04* (2013.01); *H02K 3/50* (2013.01); *B62D 5/0406* (2013.01); *H02K 2203/09* (2013.01)

(58) Field of Classification Search
CPC ............................. H02K 2203/09; H02K 3/50
See application file for complete search history.

(56) References Cited

U.S. PATENT DOCUMENTS 10,700,574 B2 * 6/2020 Ryu .......................... H02K 3/50
10,923,979 B2 * 2/2021 Lee .......................... H02K 3/345
(Continued)

FOREIGN PATENT DOCUMENTS

CN        101257235      9/2008
KR    10-2016-0056232    5/2016
(Continued)

OTHER PUBLICATIONS

Chinese Office Action dated May 27, 2023 issued in Application No. 202080008442.4.
(Continued)

*Primary Examiner* — Robert W Horn
(74) *Attorney, Agent, or Firm* — KED & ASSOCIATES, LLP

(57) ABSTRACT

The present invention may provide a motor including a housing, a stator disposed in the housing, a rotor disposed in the stator, a shaft coupled to the rotor, and a busbar disposed above the stator, wherein the stator includes a stator core, a coil, and an insulator disposed between the coil and the stator, the busbar includes a busbar body and a plurality of terminals disposed in the busbar body, and at least a part of the busbar body and at least a part of the terminals are disposed to overlap the insulator in a radial direction.

9 Claims, 10 Drawing Sheets

(51) Int. Cl.
   *H02K 3/50*    (2006.01)
   *B62D 5/04*    (2006.01)

(56) References Cited

U.S. PATENT DOCUMENTS

| | | | |
|---|---|---|---|
| 11,018,551 B2 * | 5/2021 | Ryu | ................ H02K 1/12 |
| 11,581,774 B2 * | 2/2023 | Kim | ................ H02K 3/345 |
| 2009/0152975 A1 | 6/2009 | Sasaki et al. | |
| 2017/0155299 A1 | 6/2017 | Jang et al. | |
| 2023/0031486 A1 * | 2/2023 | Kim | ................ H02K 3/345 |

FOREIGN PATENT DOCUMENTS

| | | |
|---|---|---|
| KR | 10-2016-0067338 | 6/2016 |
| KR | 10-2016-0139824 | 12/2016 |
| KR | 10-2018-0053100 | 5/2018 |

OTHER PUBLICATIONS

International Search Report dated Apr. 22, 2020 issued in Application No. PCT/KR2020/000309.

\* cited by examiner

[FIG. 1]
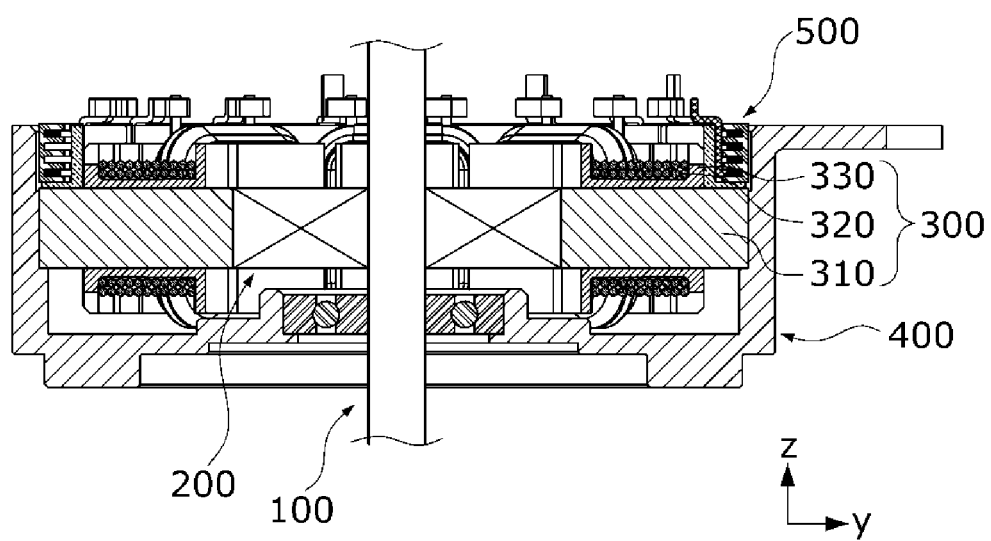

[FIG. 2]
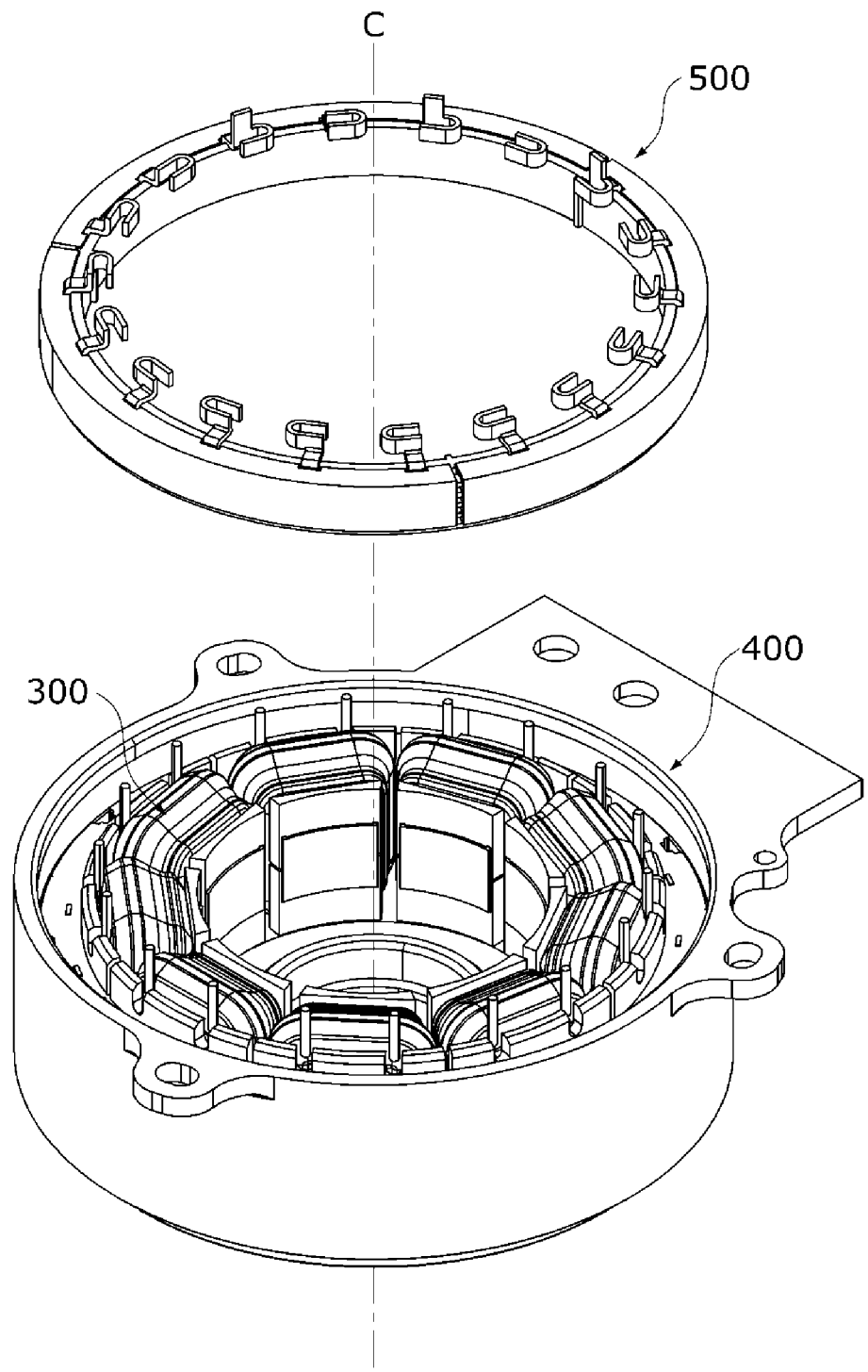

[FIG. 3]
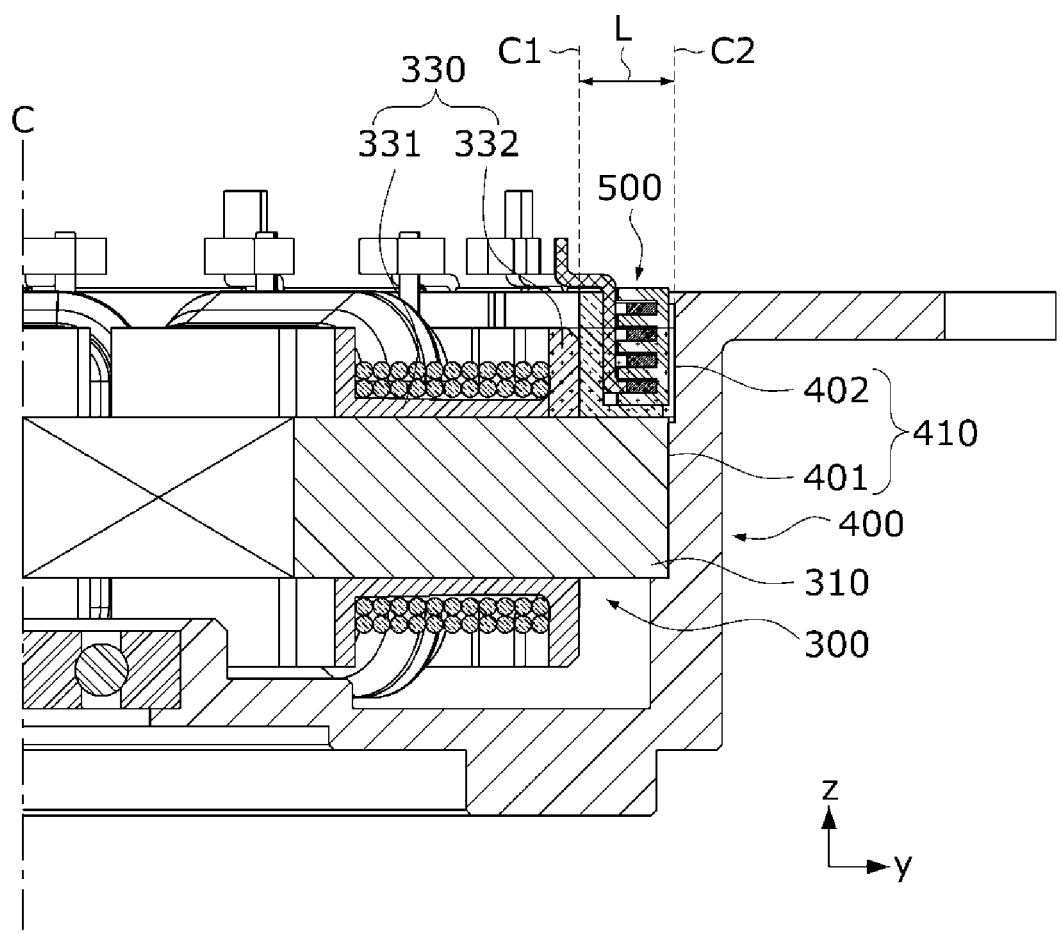

[FIG. 4]
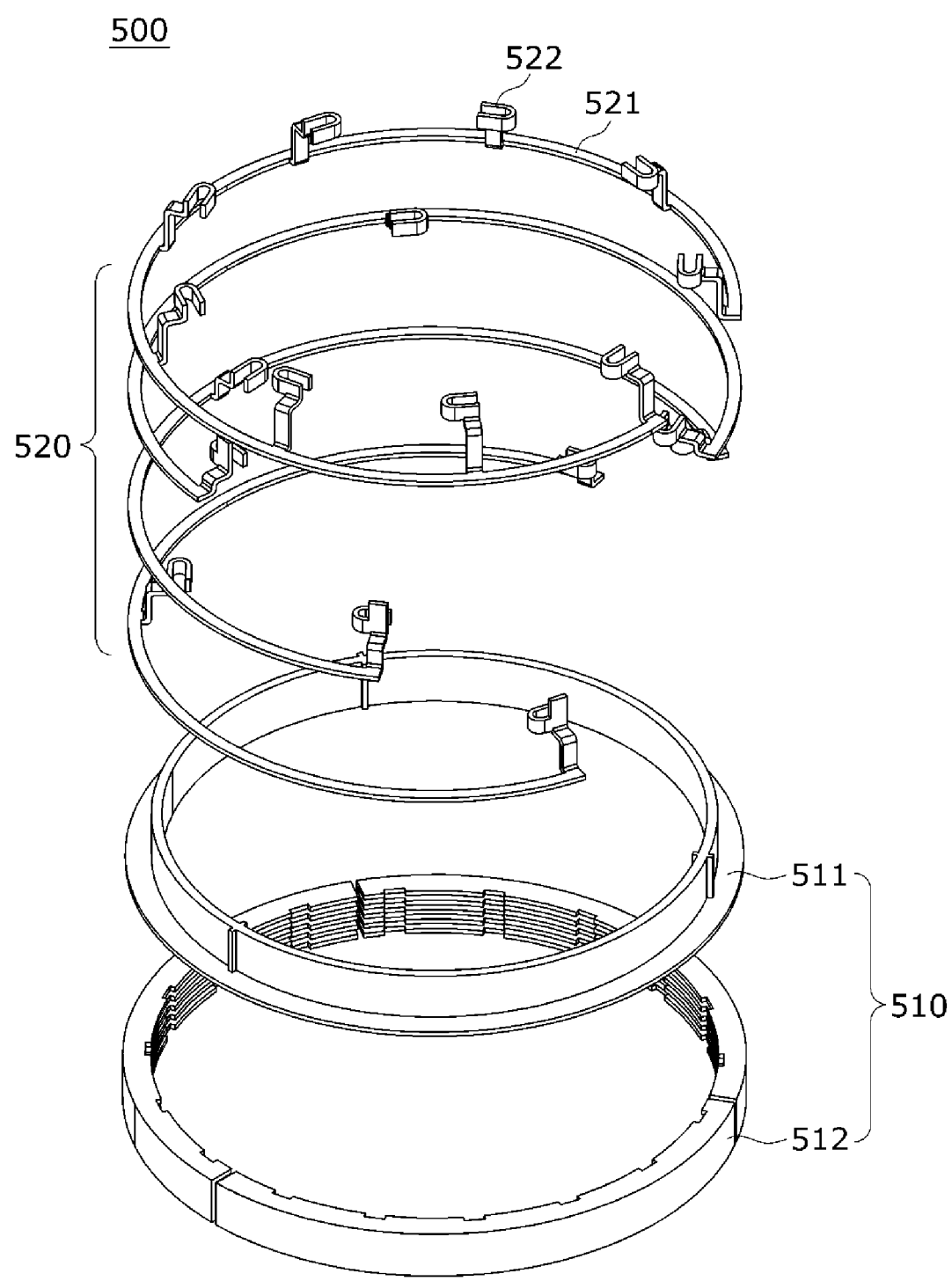

[FIG. 5]
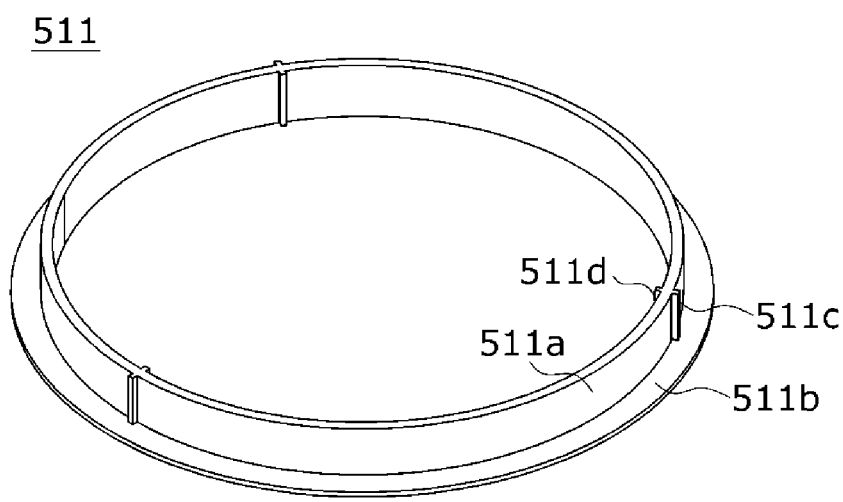

[FIG. 6]
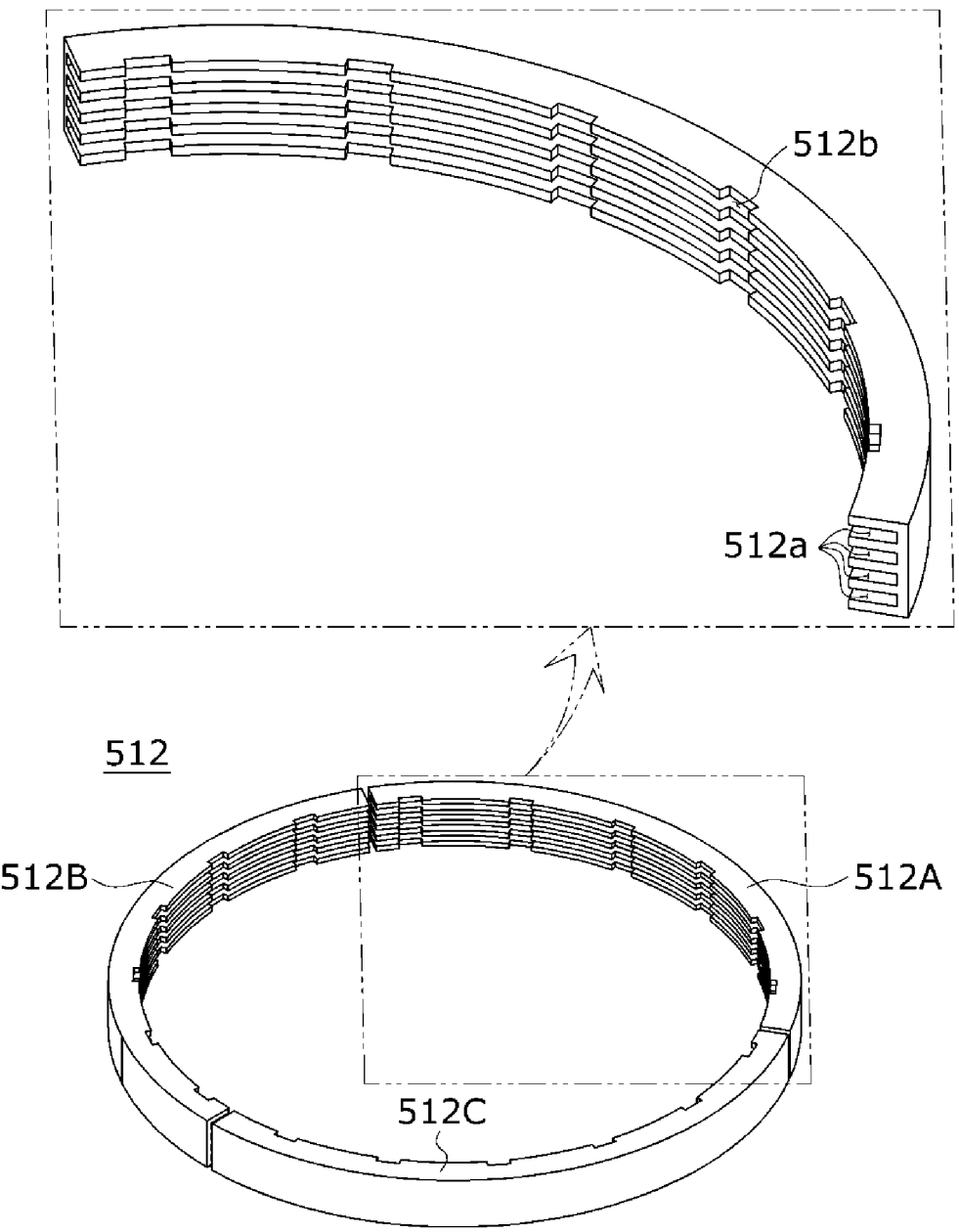

[FIG. 7]
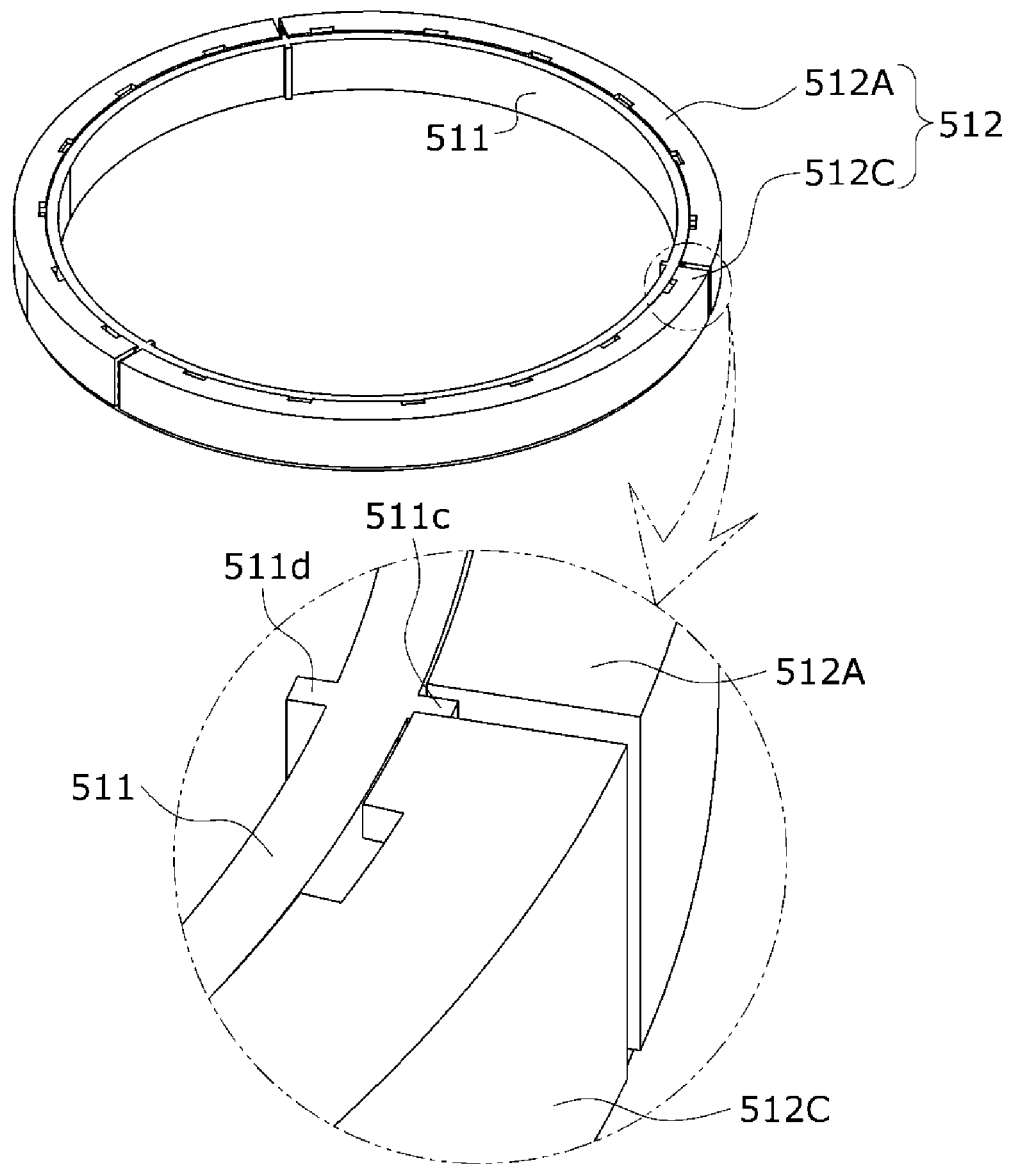

[FIG. 8]
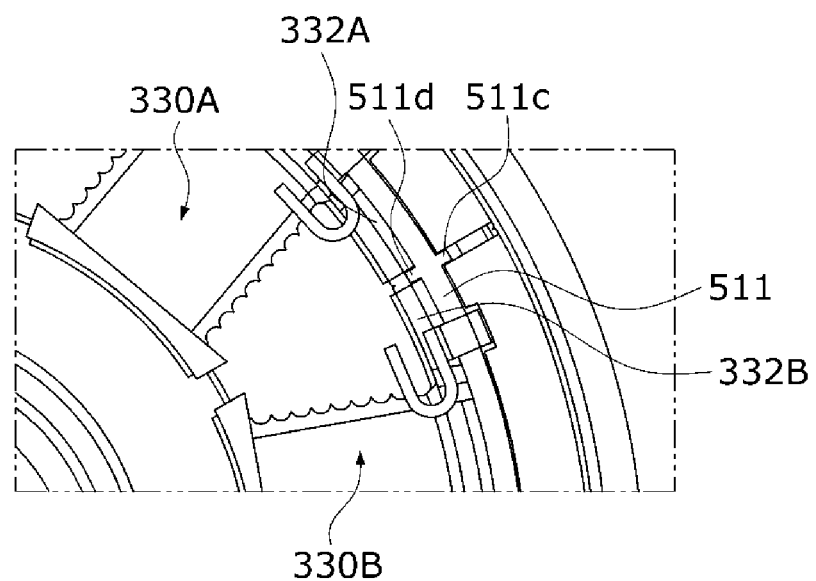

[FIG. 9]
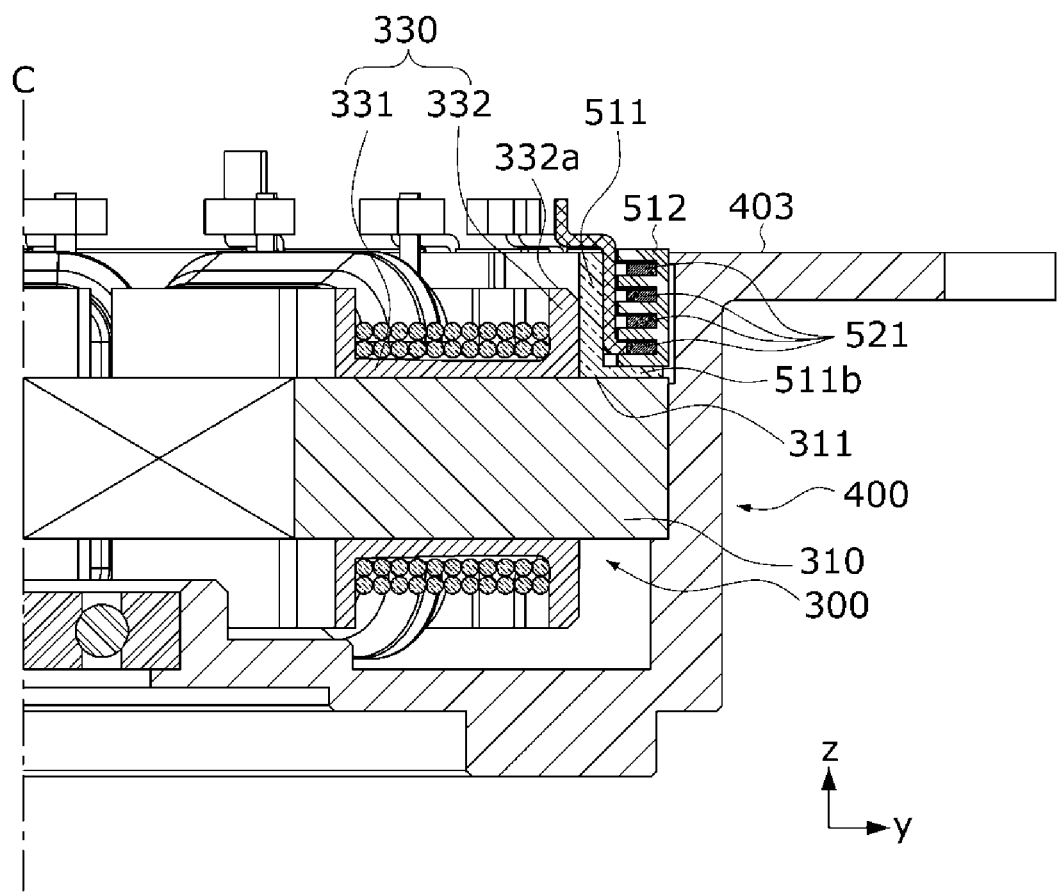

[FIG. 10]
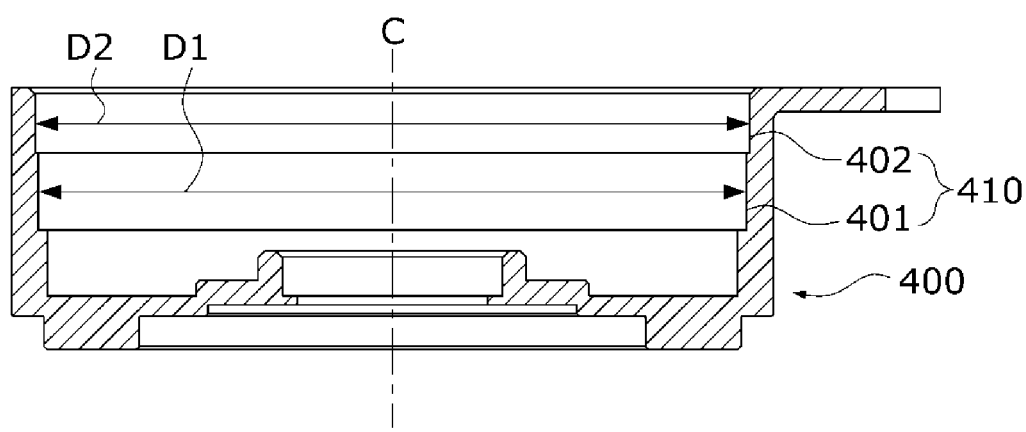

MOTOR

CROSS-REFERENCE TO RELATED PATENT APPLICATIONS

This application is a U.S. National Stage Application under 35 U.S.C. § 371 of PCT Application No. PCT/KR2020/000309, filed Jan. 8, 2020, which claims priority to Korean Patent Application No. 10-2019-0003798, filed Jan. 11, 2019, whose entire disclosures are hereby incorporated by reference.

TECHNICAL FIELD

An embodiment relates to a motor.

BACKGROUND ART

An electronic power steering (EPS) system is a device that enables a driver to travel safely by securing turning stability of a vehicle and providing rapid restoring forces. Such an EPS system controls driving of a steering shaft of a vehicle by driving a motor using an electronic control unit (ECU) according to operation conditions detected by a vehicle speed sensor, a torque angle sensor, a torque sensor, and the like.

A motor includes a rotor and a stator. The rotor is coupled to a shaft. When the rotor rotates, the shaft is rotated in conjunction with the rotation of the rotor. The stator may include a coil. The divided coil is connected to a busbar.

The busbar is disposed above the stator. Accordingly, an arrangement space for the busbar is required in an axial direction. However, such a structure has a problem of increasing a size of the motor in the axial direction.

Technical Problem

An embodiment is directed to providing a motor capable of reducing the size in an axial direction while securing an arrangement space for a busbar.

Objectives to be solved by the embodiment are not limited to the above-described objectives, and other objectives which are not described above will be clearly understood by those skilled in the art from the following specification.

Technical Solution

An embodiment provides a motor including a housing, a stator disposed in the housing, a rotor disposed in the stator, a shaft coupled to the rotor, and a busbar disposed above the stator, wherein the stator includes a stator core, a coil, and an insulator disposed between the coil and the stator, the busbar includes a busbar body and a plurality of terminals disposed in the busbar body, and at least a part of the busbar body and at least a part of the terminals are disposed to overlap the insulator in a radial direction.

An embodiment provides a motor including a housing, a stator disposed in the housing, a rotor disposed in the stator, a shaft coupled to the rotor, and a busbar disposed above the stator, wherein the stator includes a stator core, a coil, and an insulator disposed between the coil and the stator, the busbar includes a busbar body and a plurality of terminals disposed in the busbar body, and the busbar body and a terminal body of the terminal are disposed between an outer guide of the insulator and an inner circumferential surface of the housing in a radial direction.

The busbar body may include an annular base and a plurality of covers disposed to face an outer circumferential surface of the base in the radial direction, the cover may include first slots disposed on an inner circumferential surface in a circumferential direction of the cover, the plurality of first slots may be vertically disposed, and the plurality of terminals may be disposed in the first slots.

The cover may include a second slot concavely formed in the inner circumferential surface and vertically disposed to intersect with the first slot.

The base may include a first protrusion protruding from the outer circumferential surface in the radial direction and a second protrusion protruding from an inner circumferential surface in the radial direction, the first protrusion may be disposed between the cover and the cover in a circumferential direction, and the second protrusion may be disposed between the insulators which are adjacent to each other in the circumferential direction.

the busbar body may be in contact with an upper surface of the stator core.

The terminal may include terminal bodies and connecting ends which extend from the terminal bodies and are connected to the coil, the plurality of terminal bodies may be disposed to overlap each other in an axial direction, at least some of the plurality of terminal bodies may be disposed lower than an upper end of the insulator, and the connecting end may be disposed higher than the upper end of the insulator.

The base may include a flange extending outward, and the flange may be in contact with a lower surface of the cover.

An inner circumferential surface of the base may be in contact with an outer circumferential surface of the insulator.

The inner circumferential surface of the housing may include a first surface in contact with an outer circumferential surface of the stator core and a second surface disposed above the first surface, and an inner diameter of the second surface may be greater than an inner diameter of the first surface.

Advantageous Effects

According to an embodiment, an advantageous effect of reducing the size in an axial direction while securing an arrangement space for a busbar is provided.

According to an embodiment, since a structure of the busbar is simple, an advantageous effect of reducing a manufacturing cost is provided.

DESCRIPTION OF DRAWINGS

FIG. 1 is a view illustrating a motor according to an embodiment.

FIG. 2 is a perspective view illustrating a busbar disposed above a stator.

FIG. 3 is a side cross-sectional view of the motor in which a position of the busbar is shown.

FIG. 4 is an exploded view of the busbar illustrated in FIG. 2.

FIG. 5 is a view illustrating a base.

FIG. 6 is a view illustrating a cover.

FIG. 7 is a view illustrating a first protrusion disposed between unit covers.

FIG. 8 is a view illustrating a second protrusion disposed between insulators.

FIG. 9 is a side cross-sectional view of the insulator and the busbar.

FIG. 10 is a side cross-sectional view of a housing.

MODES OF THE INVENTION

Hereinafter, exemplary embodiments of the present invention will be described in detail with reference to the accompanying drawings.

However, the technical spirit of the present invention is not limited to some embodiments which will be described and may be realized in a variety of different forms, and one or more components of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

FIG. 1 is a view illustrating a motor according to an embodiment. Referring to FIG. 1, the motor according to the embodiment may include a shaft 100, a rotor 200, a stator 300, a housing 400, and a busbar 500. Hereinafter, the term "inside" denotes a direction toward the shaft 100 of the motor, and the term "outside" denotes a direction from the shaft 100 toward the housing 400, which is a direction opposite to the term "inside." Hereinafter, in the drawings, a z-axis denotes an axial direction of the motor, and a y-axis denotes a radial direction of the motor.

The shaft 100 may be coupled to the rotor 200. When an electromagnetic interaction occurs between the rotor 200 and the stator 300 through current supply, the rotor 200 rotates, and the shaft 100 rotates in conjunction with the rotation of the rotor 200. The shaft 100 may be connected to a steering apparatus of a vehicle to transmit power.

The rotor 200 rotates due to an electrical interaction with the stator 300. The rotor 200 may be disposed inside the stator 300. The rotor 200 may include a rotor core and a magnet disposed on the rotor core.

The stator 300 is disposed outside the rotor 200. The stator 300 may include a stator core 310, coils 320, and insulators 330 installed on the stator core 310. The coils 320 may be wound around the insulators 330. The insulators 330 are disposed between the coils 320 and the stator core 310. The coils 320 induce an electric interaction with the magnet of the rotor 200.

The stator 300 is disposed in the housing 400. The rotor 200 is disposed in the stator 300. In addition, the rotor 200 is disposed outside the shaft 100.

The busbar 500 is disposed above the stator 300. The busbar 500 may connect the coils 320 wound around the stator 300.

Although not illustrated in the drawing, a sensing magnet may be coupled to the shaft 100. The sensing magnet is for detecting a position of the rotor 200. A substrate may also be disposed. A sensor which detects a magnetic force of the sensing magnet may be disposed on the substrate. In this case, the sensor may be a Hall integrated circuit (IC).

FIG. 2 is a perspective view illustrating the busbar disposed above the stator, and FIG. 3 is a side cross-sectional view of the motor in which a position of the busbar is shown.

Referring to FIGS. 2 and 3, the busbar 500 includes a busbar body 510 and a plurality of terminals 520 disposed in the busbar body 510. The terminals 520 are connected to the coils 320. The insulator 330 may include a body 331 and an outer guide 332. The coils 320 are wound around the body 331.

A part of the busbar 500 is disposed to form an overlap region O with a part of the insulator 330 in the radial direction. A part of the busbar body 510 and a part of the terminal 520 may be disposed to overlap the outer guide 332 of the insulator 330 in the radial direction.

In addition, the busbar 500 may be disposed between the insulator 330 and an inner circumferential surface 410 of the housing 400 based on the radial direction. The busbar 500 may be disposed between a first reference line C1 and a second reference line C2 in the radial direction from an axial center C. The first reference line denotes a boundary of an outer circumferential surface of the outer guide 332 of the insulator 330, and the second reference line denotes a boundary of the inner circumferential surface 410 of the housing 400.

This is to reduce a length of the motor in an axial direction by using an outer space of the insulator 330 as an arrangement space for the busbar 500.

FIG. 4 is an exploded view of the busbar illustrated in FIG. 2.

Referring to FIG. 4, the busbar 500 includes the busbar body 510 and the plurality of terminals 520.

The busbar body 510 may include a base 511 and a cover 512. The base 511 and the cover 512 may be annular members. The cover 512 is disposed outside the base 511. The cover 512 may be disposed to face an outer circumferential surface of the base 511. The plurality of terminals 520 are vertically disposed. Each of the terminals 520 may include a terminal body 521 and a connecting end 522 extending from the terminal body 521.

The connecting end 522 is connected to the coil 330. The terminal body 521 may be disposed along the outer circumferential surface of the base 511. The terminal 520 may be a U-phase, V-phase, W-phase, or neutral terminal. The terminal body 521 may be an arc-shaped member. The connecting end 522 may be branched from the terminal body 521 and bent to be disposed.

The plurality of terminal bodies 521 may be disposed to overlap in the axial direction, and the plurality of connecting ends 522 may be disposed not to overlap in the axial direction. In such a structure of the busbar 500, the terminals 520 may be densely disposed, the structure of the busbar body 510 is simple, and thus a space occupied by the busbar 500 may be minimized.

FIG. 5 is a view illustrating the base.

Referring to FIG. 5, a body 511a having an annual shape and a flange 511b extending outward from the body 511a may be disposed in the base 511. The flange 511b is disposed in a lower portion of the base 511. The terminal body 521 is disposed along an outer circumferential surface of the body 511a. The body 511a may include a first protrusion 511c and a second protrusion 511d. The first protrusion 511c protrudes from an outer circumferential surface of the body 511a.

The first protrusion 511c may be provided as a plurality of first protrusions 511c. The plurality of first protrusions 511c may be disposed at predetermined intervals in a circumferential direction of the base 511. The first protrusions 511c may be vertically and longitudinally disposed along the outer circumferential surface of the body 511a. The second protrusion 511d protrudes from an inner circumferential surface of the body 511a. The second protrusion 511d may be provided as a plurality of second protrusions 511d. The plurality of second protrusions 511d may be disposed at predetermined intervals in the circumferential direction of the base 511. The first protrusions 511c may be disposed to be aligned with the second protrusions 511d based on the circumferential direction of the base 511.

FIG. 6 is a view illustrating the cover.

Referring to FIG. 6, the cover 512 may be formed as an annular member in which a plurality of unit covers 512A, 512B, and 512C are combined. The unit covers 512A, 512B, and 512C may be sequentially coupled to the base 511. The cover 512 may include first slots 512a and second slots 512b. The first slots 512a may be disposed on an inner circumferential surface of the cover 512 in a circumferential direction of the cover 512. The plurality of first slots 512a may be vertically disposed. The terminal body 521 of the terminal 520 is disposed in the first slots 512a. The terminal body 521 may be inserted into each of the first slots 512a on a side surface of the cover 512. The cover 512 in which the terminal 520 is installed is coupled to the base 511.

The second slots 512b may be disposed on the inner circumferential surface of the cover 512 in the vertical direction of the cover 512. The plurality of second slots 512b may be disposed at predetermined intervals in the circumferential direction of the cover 512. The second slots 512b is disposed to intersect with the first slots 512a. The connecting end 522 of the terminal 520 is disposed in the second slots 512b.

FIG. 7 is a view illustrating the first protrusion disposed between the unit covers.

Referring to FIG. 7, the first protrusion 511c may be disposed between the unit covers (for example, unit covers 512A and 512C) based on the circumferential direction of the base 511. The first protrusion 511c serves to align positions of the unit covers 512A, 512B, and 512C based on the circumferential direction of the base 511 and secure an installation space of the unit covers 512A, 512B, and 512C for the base 511.

FIG. 8 is a view illustrating the second protrusion disposed between insulators.

Referring to FIG. 8, the second protrusion 511d may be disposed between outer guides 332A and 332B of insulators 330A and 330B which are adjacent to each other based on the circumferential direction of the base 511. The second protrusion 511d aligns a position of the busbar 500 with respect to a position of the coil 320 based on the circumferential direction of the base 511.

FIG. 9 is a side cross-sectional view of the insulator and the busbar.

Referring to FIG. 9, the plurality of terminal bodies 521 are arranged in the busbar body 510 in the axial direction. The terminal bodies 521 may be accommodated in the cover 512 and disposed to overlap each other in the axial direction. In the busbar 500 having such a structure, since a length of the busbar 500 in the radial direction may be reduced, an arrangement space for the busbar 500 between the insulator 330 and the inner circumferential surface 410 of the housing 400 may be secured.

At least one of the plurality of terminal bodies 521 is disposed lower than an upper end of the outer guide 332 of the insulator 330. One region of the connecting end 522 connected to the coil 320 is disposed higher than the outer guide 332.

A lower surface of the busbar body 510 may be in contact with an upper surface 311 of the stator core. The busbar 500 may be supported by the stator core 310 in the axial direction. An inner circumferential surface of the base 511 may be in contact with the outer circumferential surface of the outer guide 332. Meanwhile, an upper surface of the flange 511b may be in contact with a lower surface of the cover 512.

FIG. 10 is a side cross-sectional view of the housing.

Referring to FIG. 10, the inner circumferential surface 410 of the housing 400 includes a first surface 401 and a second surface 402. The first surface 401 is a portion in contact with an outer circumferential surface of the stator core 310. The second surface 402 is a portion disposed above the first surface 401. With an outer circumferential surface of the insulator 330, the second surface 402 forms a space in which the busbar 500 is disposed based on the radial direction of the motor.

An inner diameter D2 of the second surface 402 is greater than an inner diameter D1 of the first surface 401. This is to secure a gap between the busbar 500 and the inner circumferential surface 410 of the housing 400 to secure assemblability of the busbar 500.

As described above, the motor according to one exemplary embodiment of the present invention has been specifically described with reference to the accompanying drawings.

The above description is only an example describing a technological scope of the present invention. Various changes, modifications, and replacements may be made by those skilled in the art without departing from the spirit and scope of the present invention. Therefore, the embodiments disclosed above and in the accompanying drawings should be considered in a descriptive sense only and not to limit the technological scope. The technological scope of the present invention is not limited by the embodiments and the accompanying drawings. The scope of the present invention should be interpreted by the appended claims and encompass all equivalents falling within the scope of the appended claims.

The invention claimed is:

1. A motor comprising:
a housing;
a stator disposed in the housing;
a rotor disposed in the stator;
a shaft coupled to the rotor; and
a busbar disposed above the stator,
wherein the stator includes a stator core, a coil, and an insulator disposed between the coil and the stator,
the busbar includes a busbar body and a plurality of terminals disposed in the busbar body, and
the busbar body and a terminal body of the terminal are disposed between an outer guide of the insulator and an inner circumferential surface of the housing in a radial direction.

2. The motor of claim 1, wherein:
the busbar body includes an annular base and a plurality of covers disposed to face an outer circumferential surface of the base in the radial direction;
the cover includes first slots disposed on an inner circumferential surface in a circumferential direction of the cover;
the plurality of first slots are vertically disposed; and
the plurality of terminals are disposed in the first slots.

3. The motor of claim 2, wherein the cover includes a second slot concavely formed in the inner circumferential surface and vertically disposed to intersect with the first slot.

4. The motor of claim 2, wherein:
the base includes a first protrusion protruding from the outer circumferential surface in the radial direction and a second protrusion protruding from an inner circumferential surface in the radial direction;
the first protrusion is disposed between the covers in a circumferential direction; and
the second protrusion is disposed between the insulators which are adjacent to each other in the circumferential direction.

5. The motor of claim 1, wherein the busbar body is in contact with an upper surface of the stator core.

6. The motor of claim 1, wherein:
the terminal includes terminal bodies and connecting ends which extend from the terminal bodies and are connected to the coil;
the plurality of terminal bodies are disposed to overlap each other in an axial direction;
at least some of the plurality of terminal bodies are disposed lower than an upper end of the insulator; and
the connecting end is disposed higher than the upper end of the insulator.

7. The motor of claim 2, wherein:
the base includes a flange extending outward; and
the flange is in contact with a lower surface of the cover.

8. The motor of claim 2, wherein an inner circumferential surface of the base is in contact with an outer circumferential surface of the insulator.

9. The motor of claim 1, wherein:
the inner circumferential surface of the housing includes a first surface in contact with an outer circumferential surface of the stator core and a second surface disposed above the first surface; and
an inner diameter of the second surface is greater than an inner diameter of the first surface.

* * * * *